Oct. 18, 1927.
A. J. BENNETT
1,645,577
FLOWER HOLDER
Filed Jan. 23, 1926
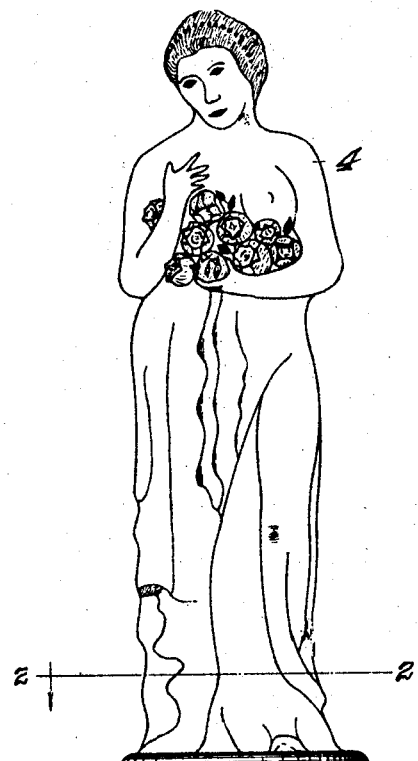
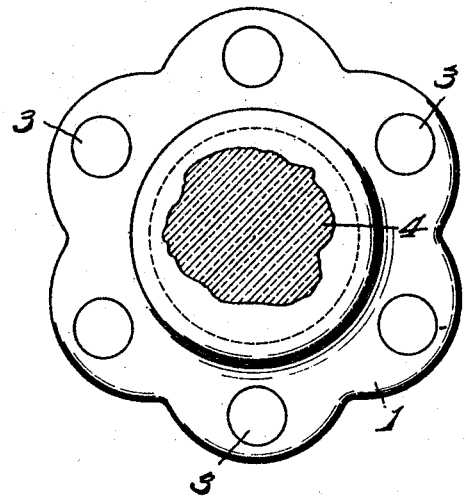
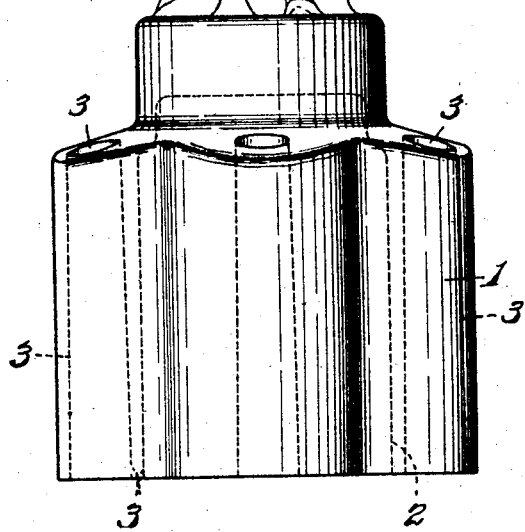
INVENTOR
Arthur J. Bennett.
BY
ATTORNEY Patented Oct. 18, 1927.

1,645,577

UNITED STATES PATENT OFFICE.

ARTHUR J. BENNETT, OF CAMBRIDGE, OHIO.

FLOWER HOLDER.

Application filed January 23, 1926. Serial No. 83,339.

This invention relates broadly to flower holders, and it has for its primary object to provide a novel and improved form of flower holding block of the general type employed in flower bowls, and embodying an integral ornamental statue or image.

In describing the invention in detail, reference is herein had to the accompanying drawings, in which—

Figure 1 is a front elevation of a flower holder embodying the invention, and—

Figure 2 is a section on line 2—2, Fig. 1.

Referring to said drawings, 1 indicates a molded base of glass or similar material preferably formed with an upwardly directed central socket 2 which, in pressing the article in a mold, is produced by the plunger of the forming press. Surmounting said base, and preferably occupying a central position with respect to the top of the latter, is a figure, statue, or image of an animate object, as the image of a woman 4 shown in Fig. 1 of the drawings. Provided in said base 1 is one or more vertical bores 3 adapted for receiving therein the stems of cut flowers. As herein illustrated, a plurality of bores 3 are arranged in relatively spaced relation in a row which encircles the lower portion of the image 4, such arrangement being at present preferred.

The structure described is designed to be seated within a bowl or dish containing water in the manner usual to flower holding blocks. When employed as a holder for flowers, the latter, disposed in upright position in the several bores provided therefor, form a bower in the midst of which and partially concealed thereby appears the statue or image 4, there being thus created a pleasing ornamental effect.

The bores extend through the bottom of the base so as to enable the stems to seat on and be supported by the bowl, and are of a length to hold the stems vertically.

What is claimed is—

A flower holder comprising a base adapted for seating within a water containing bowl, and a statue-like image surmounting said base, said base having extended therethrough a plurality of substantially vertical bores adapted for the reception of the stems of cut flowers arranged in encircling and partially concealing relation to the image, said bores being of a length so as to hold the flower stems in vertical position and extending through the bottom of the base so as to enable the stems to seat on and be supported by the bottom of the bowl.

In testimony whereof, I affix my signature.

ARTHUR J. BENNETT.